H. H. BALLIETT.
FLEXIBLE CONDUIT.
APPLICATION FILED OCT. 10, 1910.
1,005,134.
Patented Oct. 10, 1911.
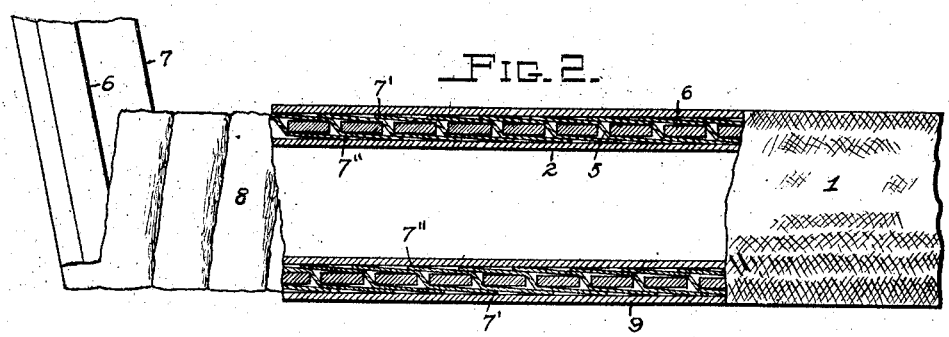
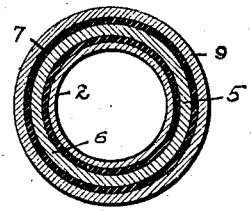
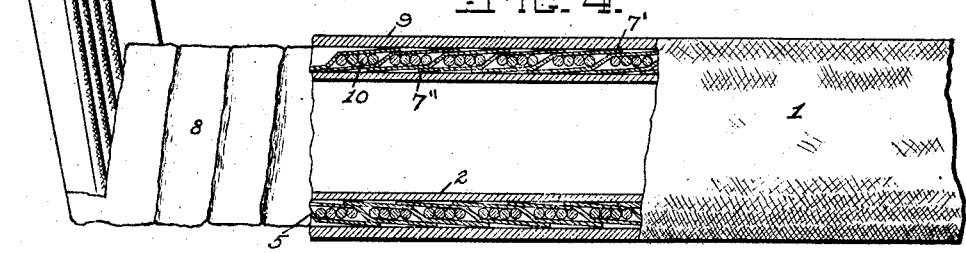
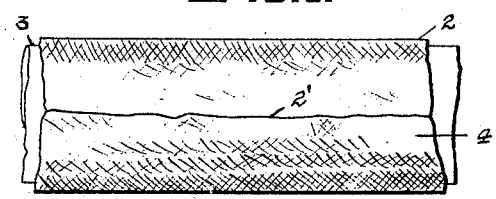
Witnesses:
Inventor:
Howard H. Balliett
By J. N. Cooke
Attorney.

UNITED STATES PATENT OFFICE.

HOWARD H. BALLIETT, OF PITTSBURGH, PENNSYLVANIA.

FLEXIBLE CONDUIT.

1,005,134.     Specification of Letters Patent.     Patented Oct. 10, 1911.

Application filed October 10, 1910. Serial No. 586,221.

*To all whom it may concern:*

Be it known that I, HOWARD H. BALLIETT, a resident of Pittsburgh, in the county of Allegheny and State of Pennsylvania, have invented a new and useful Improvement in Flexible Conduits; and I do hereby declare the following to be a full, clear, and exact description thereof.

My invention relates to flexible conduits, and has special reference to such conduits for use with electric wires.

The object of my invention is to provide a flexible conduit for electric wires and other purposes, which while possessing the necessary rigidity, flexibility, and insulating properties, may be readily bent to form curves without causing angles or sharp ridges in the conduit, and will provide against the separation and removal from the conduit of any of the component parts of the conduit, as well as providing a smooth interior in the conduit, and one in which the intermediate or main parts composing the same and around the tube will be entirely inclosed, which will make the conduit moisture and water proof, and at the same time such parts will be securely held in place.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved flexible conduit, I will describe the same more fully, referring to the accompanying drawing, in which—

Figure 1 is a side view of the inner tube for the conduit. Fig. 2 is a side view, partly in section of one form of my improved flexible conduit. Fig. 3 is a cross-section of the same. Fig. 4 is a side view, partly in section, of another form of my improved flexible conduit.

As illustrated in the drawing and as shown particularly in the form in Figs. 1 and 2, my improved flexible conduit 1 is formed to the shape and size desired on a suitable mandrel 3 or other tube forming device, and consists of an inner tube 2, which is formed of any suitable material, such as paper, muslin, or canvas, and is treated or sized with a suitable composition for adding rigidity to the same and preventing separating of the edges of the material used in said tube before being formed into the said tube. The longitudinal edges 2' of the material forming the tube 2 are drawn and held together in any suitable manner, and the outer surface of such tube 2 is provided with a coating of adhesive and waterproof compound, which will permeate into and firmly cement the tape part of the intermediate wrappings to such tube, as hereinafter described. After the inner tube 2 has been formed, the intermediate wrapping 5 is applied exteriorly to the same, and consists of a flat strip 6, which is resilient, and preferably of a paper or fiber, or paper fiber, and laid against the inner face of a tape 7, which is formed of cotton, muslin, friction tape, or other textile material to hold said strip in place and totally inclose same, while such tape is preferably permeated with an adhesive compound which will resist moisture and be waterproof. This intermediate wrapping 5 composed of the strip 6 and tape 7 is wound spirally around the tube 2 and such tape will act to inclose the strip 6 when in place on such tube by the coils 8 of said wrapping, which will allow the tape edges to overlap each other, so that one edge of said tape, such as the outer edge 7' on one coil will overlap and adhere to the tape on the preceding coil as such wrapping 5 is wound on said tube, while the other edge such as the edge 7'' on the coil being wrapped on first named coil, will be drawn down by the next succeeding coil during the wrapping and adhere to the tube 2 and to the edge 7'' of the preceding coil. After the tube 2 has thus been wrapped with the intermediate wrapping 5 a covering 9 of braided or woven fabric is applied, which if desired can be treated with a waterproof and slow burning compound, and such covering extends over such wrapping of the strip 6 and tape 7; and will adhere to the outer edges 7' on the tape 7 and thereby form the complete conduit.

In the form shown in Fig. 3, the intermediate wrapping 5 is shown as being composed of the tape 7 and a series of round cords 10 in place of the strips 6, which cords are resilient and preferably formed of paper, fiber or fabric, or other suitable material and laid against the inner face of such tape, so that such wrapping can be applied to the tube 2 in like manner as before described in connection with Fig. 1.

Powdered soapstone, graphite, mica or other suitable lubricant can be sprinkled or dusted in the interior of the tube 2 of the conduit in any suitable manner, so as to give a smooth slipping surface to the inner surface of such tube and thereby reduce friction in drawing in the wires. After the conduit has been so formed it can, if desired, be subjected to and saturated with a fire-resisting and waterproof composition to cover its surfaces, and to said surfaces powdered mica, soapstone or other suitable substance can be applied to relieve such composition of stickiness usually attendant in the same.

Various other modifications and changes in the form, preparation and minor details of construction in my improved flexible conduit may be resorted to, without departing from the spirit of the invention or sacrificing any of its advantages.

It will thus be seen that my improved flexible conduit can be easily and quickly formed and will be of a slow burning construction, as well as being proof against moisture and water, while at the same time the form and construction of the conduit will enable the intermediate wrapping to have its strips or coils completely inclosed and secured around the inner tube so that they will be prevented from separating or being removed from such tube.

The parts of my improved flexible conduit can be easily and conveniently assembled at a continuous operation and can be readily and cheaply manufactured.

What I claim as my invention and desire to secure by Letters Patent is—

1. In a flexible conduit, the combination of an inner tube, an intermediate spiral wrapping applied exteriorly around said tube comprising a spiral strip having an inclosing winding around and under each of the coils of said strip, and an outer covering applied around said wrapping.

2. In a flexible conduit, the combination of an inner tube, an intermediate spiral wrapping applied exteriorly around said tube and composed of a spiral strip and means inclosing said strip and passed under each of its coils, and an outer covering applied around said wrapping.

3. In a flexible conduit, the combination of an inner tube, an intermediate spiral wrapping applied exteriorly around said tube and composed of a spiral strip having an inclosing tape around and under each of the spiral coils, and an outer covering applied around said wrapping.

4. In a flexible conduit, the combination of an inner tube, an intermediate spiral wrapping applied exteriorly around said tube and composed of a spiral strip having an inclosing tape around and under the same whose edges overlap in each of the coils of the spiral strips, and an outer covering applied around said wrapping.

5. In a flexible conduit, the combination of an inner tube, an intermediate spiral wrapping applied exteriorly around said tube and composed of a spiral strip having an inclosing adhesive tape around and under each of the coils of said spiral strips, and an outer covering applied around said wrapping.

6. In a flexible conduit, the combination of an inner tube, an intermediate spiral wrapping applied exteriorly around said tube and composed of a spiral strip having an inclosing adhesive tape wound around and under the same, the edges of adjacent coils of said tape overlapping each other, and an outer covering applied around said wrapping.

In testimony whereof, I, the said HOWARD H. BALLIETT, have hereunto set my hand.

HOWARD H. BALLIETT.

Witnesses:
   T. B. HUMPHRIES,
   JAMES L. WEHN.